United States Patent [19]

Suomi et al.

[11] Patent Number: 5,537,458
[45] Date of Patent: Jul. 16, 1996

[54] FACSIMILE TRANSMISSION IN A DIGITAL CELLULAR RADIO NETWORK

[75] Inventors: Arto Suomi; Mikko Terho, both of Tampere, Finland

[73] Assignee: Nokia Telecommunications Oy, Espoo, Finland

[21] Appl. No.: 211,753

[22] PCT Filed: Aug. 16, 1993

[86] PCT No.: PCT/FI93/00323

§ 371 Date: Apr. 15, 1994

§ 102(e) Date: Apr. 15, 1994

[87] PCT Pub. No.: WO94/05114

PCT Pub. Date: Mar. 3, 1994

[30] Foreign Application Priority Data

Aug. 17, 1992 [FI] Finland ................................. 923683

[51] Int. Cl.$^6$ ............................................. H04Q 7/22
[52] U.S. Cl. ................ 379/59; 379/60; 379/100; 370/95.1
[58] Field of Search .............. 370/95.1; 379/59, 379/60, 100

[56] References Cited

U.S. PATENT DOCUMENTS

| | | |
|---|---|---|
| 4,881,129 | 11/1989 | Mitsuhashi . |
| 4,977,609 | 12/1990 | McClure . |
| 5,119,375 | 6/1992 | Paneth et al. ......................... 370/95.1 |
| 5,127,048 | 6/1992 | Press et al. ............................ 379/100 |
| 5,400,391 | 3/1995 | Emura et al. ........................... 379/59 |
| 5,406,616 | 4/1995 | Bjorndahl ................................ 379/59 |
| 5,418,838 | 5/1995 | Havermais et al. ..................... 379/60 |

FOREIGN PATENT DOCUMENTS

| | | |
|---|---|---|
| 334669 | 9/1989 | European Pat. Off. . |
| 2240904 | 8/1991 | United Kingdom . |

OTHER PUBLICATIONS

WO, A1, 9202100, 6 Feb. 1992, p. 3, line 13,—p. 4, line 25.

*Primary Examiner*—Curtis Kuntz
*Assistant Examiner*—William Cumming
*Attorney, Agent, or Firm*—Cushman Darby & Cushman

[57] ABSTRACT

A facsimile service arrangement in a digital cellular radio network including radio terminal equipment; data terminal equipment which is connected to the radio terminal equipment and is the source or destination of fax messages to be transmitted; a fax device with a 2-wire line interface and a control interface, to which the data terminal equipment is operationally connected to control the fax device; a network terminating unit disposed in a mobile exchange; and call control means for establishing a digital data transmission connection between the network terminating unit and the radio terminal equipment. The fax device is a fax modem disposed in the network terminating unit, and the data terminal equipment is operationally connected to the control interface of the fax modem through the radio terminal equipment and the digital data transmission connection.

9 Claims, 3 Drawing Sheets

Fig. 1 (PRIOR ART)
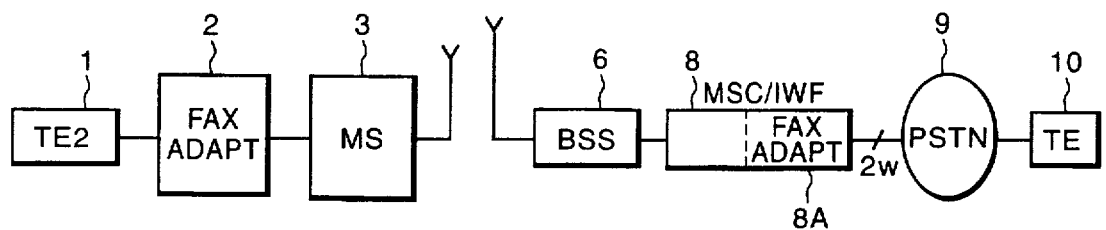
Fig. 2
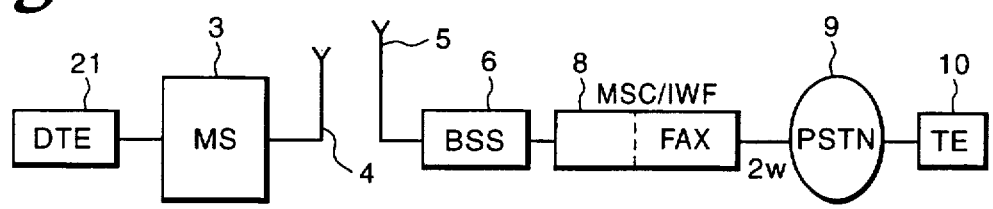
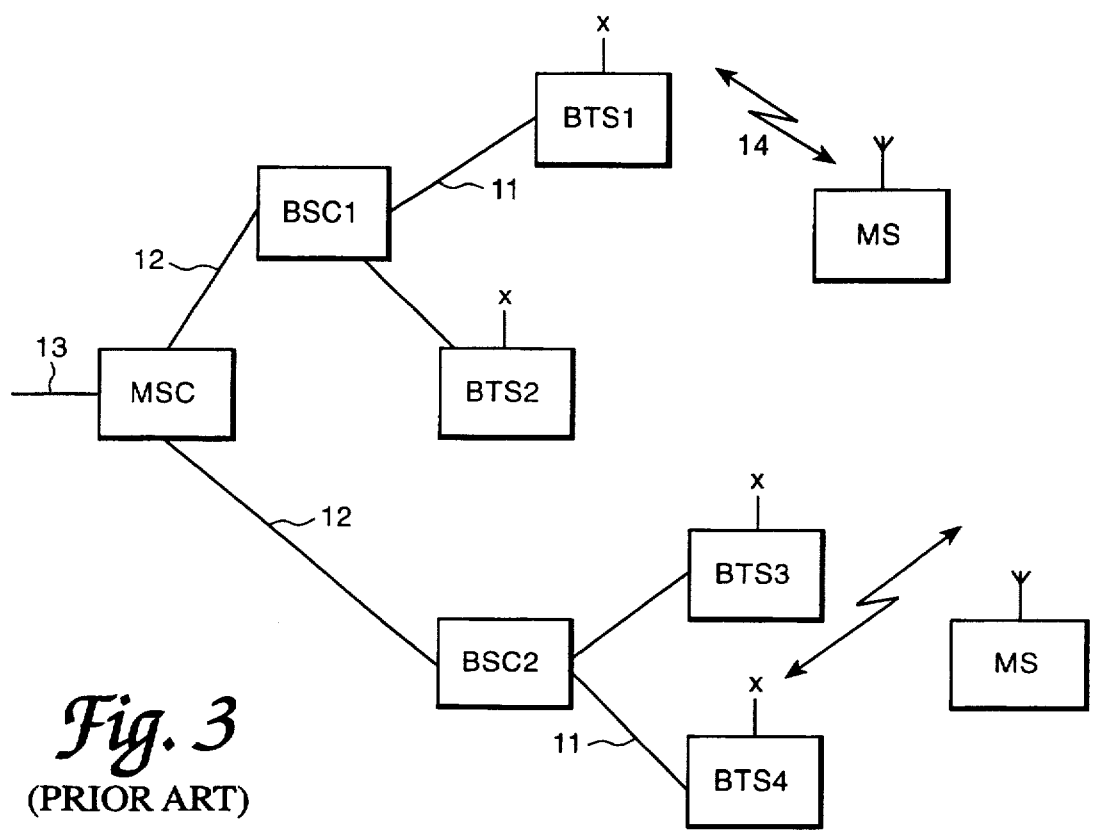
Fig. 3 (PRIOR ART)

FACSIMILE TRANSMISSION IN A DIGITAL CELLULAR RADIO NETWORK

FIELD OF THE INVENTION

The invention relates to a facsimile service in a digital cellular radio network.

BACKGROUND OF THE INVENTION

In connection with the standardization of the European mobile phone system GSM plans have been made to include a facsimile service in the system with equipment configuration as shown in FIG. 1. The present facsimile terminals employ a modem interface and a 2-wire connection (modem connection), for example, via a telephone network. Thus, all signalling between fax terminals has taken place over a modem connection. In a digital cellular radio network at least one of the fax terminals would be disposed in connection with a mobile radio unit, whereby the fax connection must be established through a radio link between the mobile radio unit and the fixed network. In the GSM cellular radio system, this has been planned to be embodied in accordance with FIG. 1: a fax terminal 1 is connected in a normal manner over a 2-wire modem connection to a specific fax adaptor 2, by means of which the signals of the 2-wire connection are adapted to a specific data connection established over the radio link between the mobile radio unit MS and the base station system BSS to a mobile exchange MSC and further to a network terminating unit IWF comprising a second fax adaptor 5. The second fax adaptor 5 adapts the above-mentioned data connection to a conventional 2-wire modem connection, for example, through a public switched telephone network PSTN to another fax terminal. The implementation of a fax connection over a radio path involves, however, different kinds of problems, wherefore the standardization of the facsimile service according to FIG. 1 is still unaccomplished, and the facsimile service will not be available for the GSM users for some time.

SUMMARY OF THE INVENTION

An object of the present invention is to render facsimile transmission possible in the present digital cellular radio systems.

According to the invention, an arrangement for facsimile transmission in a digital cellular radio network, this arrangement comprising radio terminal equipment; data terminal equipment which is connected to the radio terminal equipment and is the source or destination of fax messages to be transmitted; a fax device with a line interface for a fax connection and a control interface, to which the data terminal equipment is operationally connected to control the fax device; a network terminating unit in a mobile exchange; and call control means for establishing a digital data transmission connection between the network terminating unit and the radio terminal equipment, is characterized in that the fax device is a fax modem disposed in the network terminating unit, and that the data terminal equipment is operationally connected to the control interface of the fax device through the radio terminal equipment and said digital data transmission connection.

The idea of the invention is to dispose a fax modem in a network terminating unit in association with a mobile exchange so that a data terminal in association with the radio unit controls the fax modem through a standard data connection established between the network terminating unit and the radio unit. In other words, the data terminal, e.g. a personal computer PC, controls the fax modem as if it were connected directly to the data terminal via a standard control interface except that in the invention the standard interface is "extended" over the data connection through the cellular radio network. The invention allows the fax modem to be a commercially available fax terminal and the data terminal to be e.g., a conventional personal computer PC provided with software for such transmission carried out through the fax modem. By means of the invention it is possible to avoid system-specific fax adaptors at both ends of the data connection, whereas in the configuration under standardization they are necessary. Thus, the invention renders it possible to implement a facsimile service very advantageously even with the existing commercial equipment and by the use of existing data transmission facilities of a cellular radio telephone.

BRIEF DESCRIPTION OF THE DRAWINGS

The invention will be described in more detail by means of illustrative embodiments with reference to the accompanying drawings, in which:

FIG. 1 is a block diagram which illustrates the system configuration for facsimile transmission as intended to be implemented according to the GSM recommendations, FIG. 2 is a block diagram which illustrates the system configuration for facsimile transmission according to the invention, FIG. 3 is a block diagram which illustrates the structure of a cellular radio system.

DETAILED DESCRIPTION OF A PREFERRED EMBODIMENT OF THE INVENTION

Figure 4:
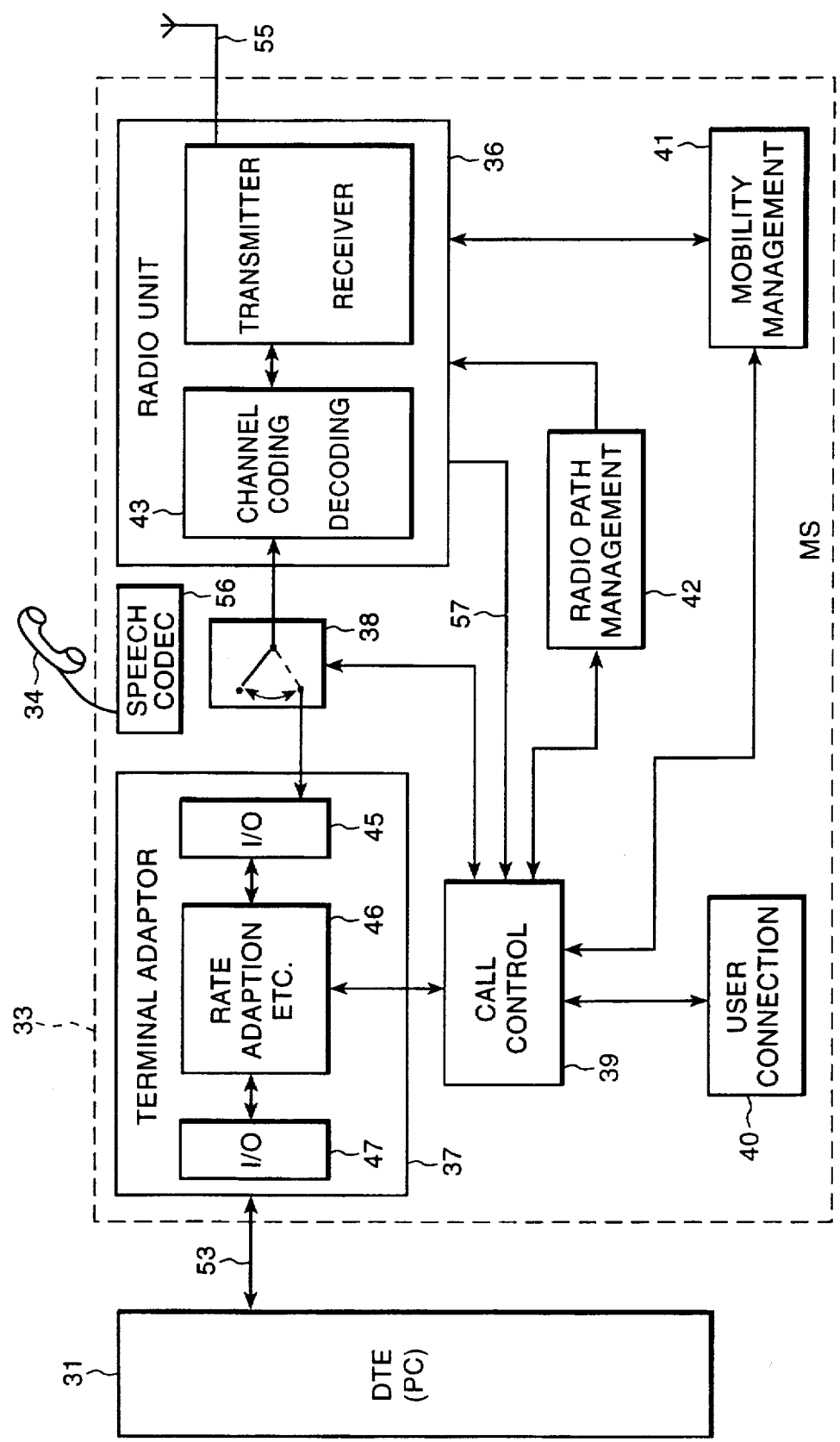
FIG. 4 is a block diagram which illustrates the structure of a mobile station and the connection of a data terminal thereto.

The fax transmission concept according to the present invention is applicable to any digital cellular radio system. It is particularly suitable for use in the European digital mobile telephone system GSM and corresponding digital systems, such as DCS1800 and PCN (Personal Communication Network). In the following, the preferred embodiment of the invention will be described in connection with the GSM system; it is, however, not restricted to this system.

FIG. 3 is a schematic view of part of the GSM cellular radio system. In a cellular radio system the area covered by the system is divided into radio cells. Two base station controllers BSC1 and BSC2 are connected to a mobile exchange MSC by digital transmission connections 12. Base stations BTS1, BTS2 and correspondingly BTS3 and BTS4 are further connected to the base station controllers BSC1 and BSC2 by digital transmission connections 11. Each BSC and the base stations associated with it form a base station system BSS. Typically the radio coverage area of a base station BTS forms a radio cell. Each base station BTS1–BTS4 has a predetermined number of physical radio channels. A signal (physical channel) of the GSM system consists of TDMA frames, each of which contains preferably eight time slots used as logical channels. The logical channels contain traffic channels for calls (voice and data) to be set up with mobile stations MS located within the cell, and control channels for signalling performed with the mobile stations located within the cell. Over the traffic channels it is possible to establish a speech connection, a V.110 rate-adjusted 64 kbit/s full-duplex data connection or a 9.6/4.8/ 2.4 kbit/s data connection. The invention can, however, be applied to any digital transmission channel. Special purpose adaptors are typically required at both ends of the data connection for adapting the data connection to terminal equipment and/or other transmission connections/systems. The adaptor connected to the terminal equipment is usually called a terminal adaptor, and the adaptor at the network end a network adaptor. In the GSM mobile phone system such a network adaptor is located in a mobile exchange MSC.

According to the invention, a facsimile service for a mobile station MS can be provided in a cellular radio system by disposing a fax modem FAX in a network adaptor IWF of a mobile exchange MSC. A data terminal 21 (DTE) connected to the mobile station MS can thus control the fax modem through a data connection which is established on a logical traffic channel from the mobile station MS to the MSC by means of the radio link between the MS and the base station system BSS. The control interface of the fax modem FAX is connected to said data connection, and the line interface (modem interface) is connected to a normal telephone or modem connection (2w), at the other end of which there is another conventional fax terminal equipment 10, which may be connected e.g. to a public switched telephone network 9 (PSTN).

The fax modem FAX in the network adaptor IWF can be any suitable modem intended for fax transmission, e.g. a fax modem of the type Class1 or Class2. Class1 and Class2 are EIA standard proposals and de facto industrial standards specifying the protocol for an asynchronous interface between fax modems and the software using them. The difference between these two classes is that a Class1 modem attends only to the physical and data connection layer of a fax session, whereas a Class2 modem also deals with T.30 fax session management (and leaves thus less responsibility for the software). Normally when Class1/Class2 fax modems are used, the physical link between the computer PC and the fax modem is a serial cable, e.g. RS-232. In the invention this serial connection is extended as an asynchronous data connection through the cellular radio system.

FIG. 4 shows a mobile station MS and data terminal equipment DTE connected thereto. The MS 33 comprises a radio unit 36, call control 39, a user interface 40 (e.g. keyboard and display), mobility management 41, radio path management (signalling functions) 42, and a terminal adaptor 37 providing a V.24 interface. The radio unit 36 comprises e.g., a radio transceiver connected to an antenna 55, and a channel coding and decoding unit 43. By means of a two-way switch unit 38, the unit 43 can be connected either to a telephone unit, comprising e.g. a speech codec 56 and a telephone receiver 34, or to a terminal adaptor 37.

The terminal adaptor 37 comprises a unit 46 which performs adaption for the GSM data connection. The unit 46 is connected to the two-way switch 38 via an I/O circuit 45 and to a data terminal 31 via an I/O circuit 47, which forms the interface 53 (e.g. V.24).

Figure 5:
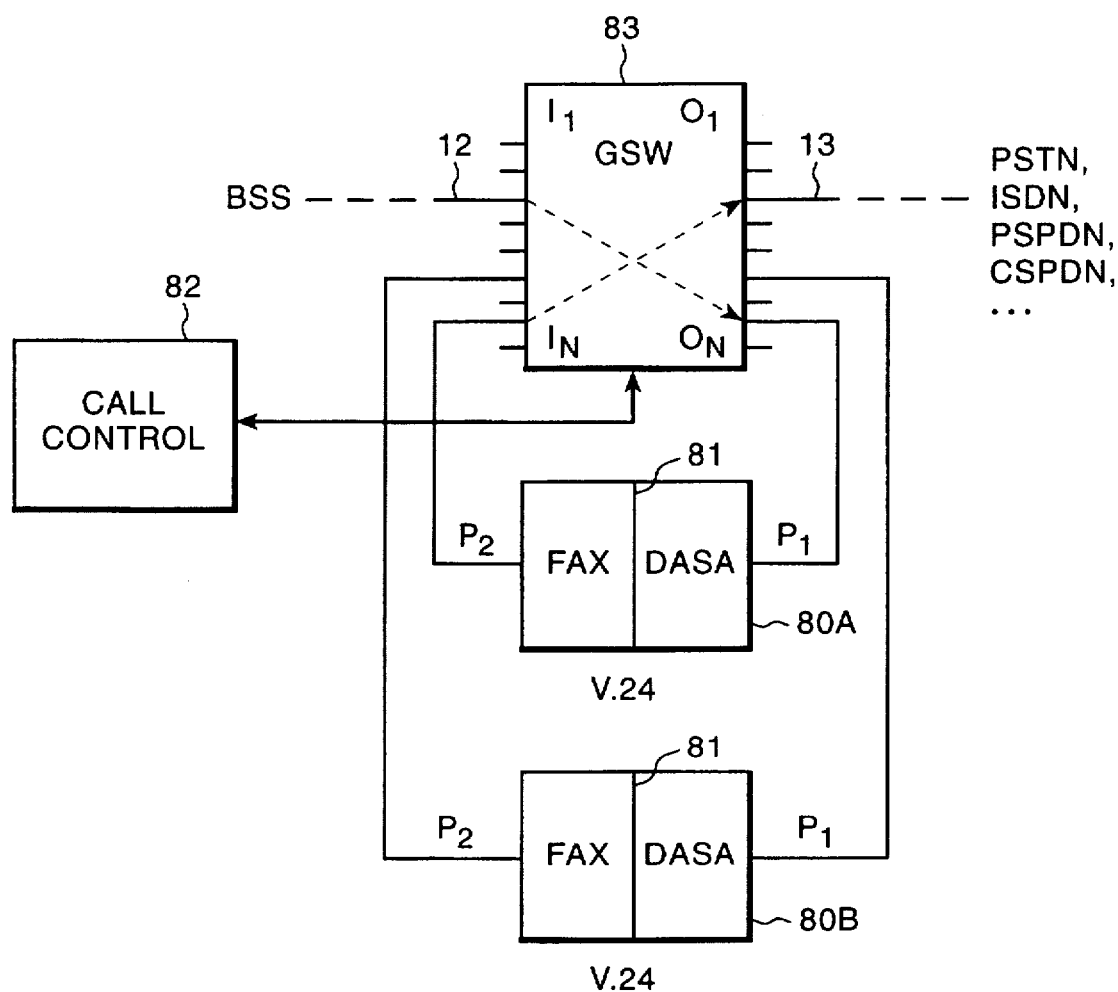
FIG. 5 is a block diagram which illustrates a mobile exchange implemented according to the invention.

FIG. 5 illustrates one way of applying the invention to a mobile exchange MSC. For the sake of clarity, FIG. 5 shows only the switching field 83 and call control 82 included in the exchange, but in practice an MSC contains a large number of various devices. The switching field 83 may be an analog or digital switching device which selectively connects speech and data connections between transmission lines 12 from the base station system BSS and transmission lines 13 from a mobile exchange. An example of such digital telephone exchanges is Telenokia DX 220 MSC.

A network adaptor 80A (IWF) is connected in parallel with the switching field 83 in such a manner that the signal port P1 of the network adaptor is connected to the port $O_{N-1}$ of the switching field 83, and the signal port P2 is connected to the port $I_{N-1}$ on the opposite side of the switching field 83. Another network adaptor 80B (or more) can be connected correspondingly in parallel with the switching field 83. The network adaptor 80 comprises a data transmission service adaptor DASA close to the port P1, said adaptor adapting the GSM data connection to the V.24 interface 81. The control interface of a fax modem FAX is connected to the V.24 interface 81, and the line or modem interface of the fax modem FAX is connected to port P2 of the network adaptor 80. In the following, the operation of the fax arrangement according to the invention will be described so that mobile originated and mobile terminated calls will be dealt with separately.

As the fax modem FAX disposed in the network adaptor 80 is not a standard facility of the GSM system, a special way must be developed for addressing it from the MS. In one embodiment of the invention, a dedicated telephone number is reserved for the facsimile service; calls made to this number are routed automatically to the network adaptor 80 of the MSC. When the MS wishes to send a fax, it initiates the fax transmission by making a call to this fax service number. The MSC routes the call to the network adaptor 80 by connecting line 12 to port P1 of the network adaptor 80A, and by connecting port P2 to another outgoing line 13, as illustrated by a broken line in FIG. 5. After the establishment of a data connection between a terminal adaptor 37 and the network adaptor 80A, an indication of the completed connection establishment is sent to the MS e.g. in the form a CONNECT call control message. The DTE issues suitable Class1/Class2 and AT commands over the data connection to a fax modem FAX, which dials the number of the receiving fax terminal 10 and establishes a modem connection with it. Once the fax session has been started, the DTE controls the fax modem FAX as if they were connected directly to each other. When the fax session is to be terminated, the DTE gives a termination command to the fax modem FAX, whereafter the MS disconnects the GSM call in the normal way.

An alternative way of establishing the data connection is to use the Bearer Capability element of a GSM call set-up message in a non-standard way: for example, by setting the modem type field to an undefined value.

A mobile terminated call is somewhat more difficult. If fax connections are also desired for mobile terminated calls, another service number may be used for example as follows. The MSC has a service number which is dedicated for incoming fax calls to the MS. A user (e.g. subscriber of a public switched telephone network PSTN) who wants to send a fax to a mobile station MS can manually dial this number. This call may at first be directed, for example, to the call control 82 of the MSC. When the service number replies, the user presses the transmission button in his fax machine, whereby the fax machine transmits the number of the subscriber station MS as DTMF (Dual Tone Multi Frequency) tone codes. The MSC decodes these DTMF tone codes and starts call set-up with said MS. When a data connection has been established, the MSC connects the data connection in the manner described above to the fax modem FAX and connects the link on line 13, coming from the PSTN, from the fax machine 10 to port P2 of the network adaptor 80A. When the fax modem FAX of the network adaptor 80A observes that the fax machine 10 is calling it through the modem connection, it outputs a RING message from a serial control interface 81. This message is transmitted over the GSM data connection to a serial port 53 of the data terminal 21, and, as a response, the data terminal sends a reply command to the fax modem. Thereafter the fax session continues in accordance with a normal Class1/Class2 case except that the data terminal must again control the MS to disconnect the GSM radio link after the fax session is terminated.

The DTE 21 may be, for example, a conventional personal computer PC, such as MikroMikko 4TT m326, with suitable fax communication software, such as WINFAX. The fax modem FAX may be, for example, Headlink 24 FAX, which is a fax modem of the type Class2. The other fax machine 10 may be any standard fax machine. The transmission rate of the GSM data connection is preferably 9600 bit/s.

The settings of the control interface (W.24) of the fax modem FAX may be, for example, as follows: line speed 4800 bit/s; error correction LAPM; terminal speed 9600 bit/s; flow control (off), and V.24 control lines as follows: 108.1 and RTS are ignored, and DSR, DCD and CTS are always on. The selected line speed of the fax modem FAX may also be 9600 bit/s, but in that case suitable compression, such as V.42 bis, must be used in the fax transmission.

The figures and the associated description are intended merely to illustrate the present invention. The details of the present invention may vary within the scope and spirit of the attached claims.

I claim:

1. An arrangement for facsimile transmission in a digital cellular radio network, said arrangement comprising:

radio terminal equipment;

data terminal equipment which is connected to the radio terminal equipment and is the source or destination of fax messages to be transmitted;

a fax device with a line interface for a fax connection and a control interface, to which the data terminal equipment is operationally connected to control the fax device;

a network terminating unit in a mobile exchange; and call control means for establishing a digital data transmission connection between the network terminating unit and the radio terminal equipment;

the fax device being a fax modem disposed in the network terminating unit; and the data terminal equipment being operationally connected to the control interface of the fax device through the radio terminal equipment and said digital data transmission connection.

2. The arrangement according to claim 1, wherein:

in the case of an outgoing fax call, the radio terminal equipment initiates the fax call by instructing the call control means to establish said data transmission connection, whereafter the data terminal equipment starts a fax session through the radio terminal equipment, the data transmission connection and the fax device with another fax device at the other end of the fax connection.

3. The arrangement according to claim 1, wherein:

in the case of an outgoing fax call, the radio terminal equipment initiates the fax call by dialling a predetermined service number, which results in the establishment of said data transmission connection, whereafter the data terminal equipment starts a fax session through the radio terminal equipment, the data transmission connection and the fax device with another fax device at the other end of the fax connection.

4. The arrangement according to claim 1, wherein:

the call control means are responsive to incoming fax call so as to initiate the establishment of said data transmission connection, whereafter the data terminal equipment starts a fax session through the radio terminal equipment, the data transmission connection and the fax device with another fax device at the other end of the fax connection.

5. The arrangement according to claim 4, wherein:

the establishment of the data transmission connection is initiated by dialing a predetermined service number and transmitting the number of the called radio terminal equipment.

6. The arrangement according to claim 2, wherein:

the fax connection between the fax device and said other fax device is a connection in a public switched telephone network.

7. The arrangement according to claim 1, wherein:

the control interface of the fax device is in compliance with EIA Recommendation Class 1 or Class 2.

8. The arrangement according to claim 1, wherein:

the control interface of the fax device and the data terminal is a serial interface, the signals of which are transferred over said data transmission connection transparently or non-transparently.

9. The arrangement according to claim 8, wherein:

said serial interface is an RS-232 serial interface.

\* \* \* \* \*